Oct. 25, 1966  K. H. SCHNEIDER ETAL  3,281,689
R.M.S. METER CIRCUIT USING LINEAR RESISTORS AND
VOLTAGE BIASED DIODES TO APPROXIMATE THE SQUARE
LAW CHARACTERISTIC
Filed March 26, 1962

INVENTORS
KURT SCHNEIDER
OSWALD G. KOESSEL
BY Roy C. Hapgood
ATTORNEY 3,281,689
R.M.S. METER CIRCUIT USING LINEAR RESISTORS AND VOLTAGE BIASED DIODES TO APPROXIMATE THE SQUARE LAW CHARACTERISTIC
Kurt H. Schneider, Queens, and Oswald G. Koessel, Brooklyn, N.Y., assignors to Expando Meter Company, Long Island City, N.Y., a corporation of New York
Filed Mar. 26, 1962, Ser. No. 182,387
4 Claims. (Cl. 324—132)

This invention relates in general to electrical meter circuits and in particular to a meter circuit which is adapted to indicate the true root-mean-square (R.M.S.) value of applied voltages or currents. The meter circuit of this invention is a rectifier type R.M.S. meter circuit, in which A.C. voltages are first rectified and then measured with a D.C. meter. With minor alterations, the meter circuit of this invention can also be used to measure power consumption (watts).

Rectifier type R.M.S. meter circuits per se are old in the art, but in the past they have suffered from several serious drawbacks. In the most common prior art circuit, the current applied to the meter movement itself is the average value of the input current rather than the R.M.S. value of the input current. In the case of a pure sine wave, the average current is equal to 0.637 times the maximum current, while the R.M.S. current is equal to 0.707 times the maximum current. Therefore, to provide an R.M.S. indication for sinusoidal currents, this prior art meter circuit was calibrated to read 1.11 times the current actually flowing through the meter. This calibration provided a fairly accurate indication of R.M.S. current or voltage for pure sine wave input, but it was subject to large errors (up to 11%) with distorted sine wave inputs or non-sinusoidal inputs, since the relation between average currents and R.M.S. current varies in accordance with the input waveform. This prior art circuit was therefore limited to use with relatively pure sine wave input voltages.

In another prior art circuit, the pure sine wave limitation was partially overcome through the use of a squaring network which produced an output approximately equal to the square of the average input current. This circuit used an input transformer with two secondary windings; one secondary winding being coupled to a rectifier and reference circuit which energized the squaring circuit, and the other secondary winding being coupled to a second rectifier which produced an output current proportional to the average input current. The output of the second rectifier (average current) was applied to the squaring network, which was coupled to a D.C. meter. This circuit could tolerate up to 33% third harmonic distortion in its sine wave input, but its frequency response was severely limited (50 to 2,000 c.p.s.) and its power consumption was quite high (3½ watts). Therefore this second prior art circuit could only be used with high power input signals within a very limited frequency range. Furthermore, it had the additional drawbacks of being relatively complex, relatively costly, and relatively heavy (1.5 pounds).

In accordance with this invention, however, a simple, inexpensive, light weight meter circuit (3 ounces) has been devised which measures the true R.M.S. value of input signals over a broad frequency range (0 to 20,000 c.p.s.) at low power levels (0.036 watt) regardless of input waveform or input distortion level. The manner in which these ends are achieved will be best understood from the following description of two specific embodiments of the invention, as illustrated in the attached drawing, in which.

Figure 1:
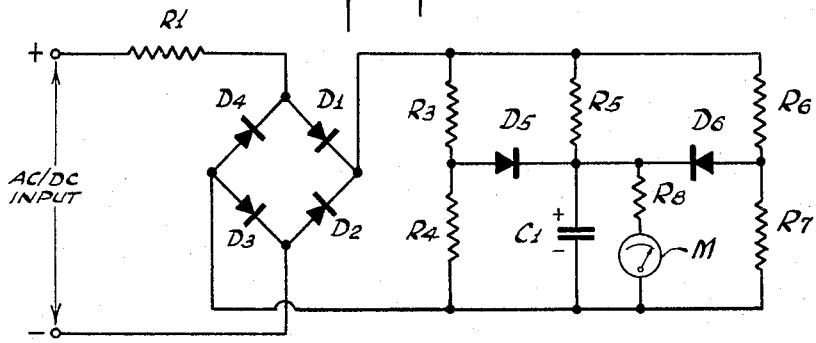
FIG. 1 is a schematic diagram of a voltmeter circuit of this invention.
Figure 2:
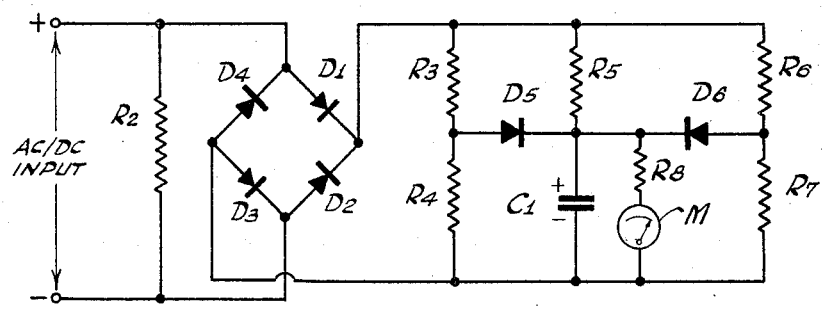
FIG. 2 is a schematic diagram of an ammeter circuit of this invention.
Figure 3:
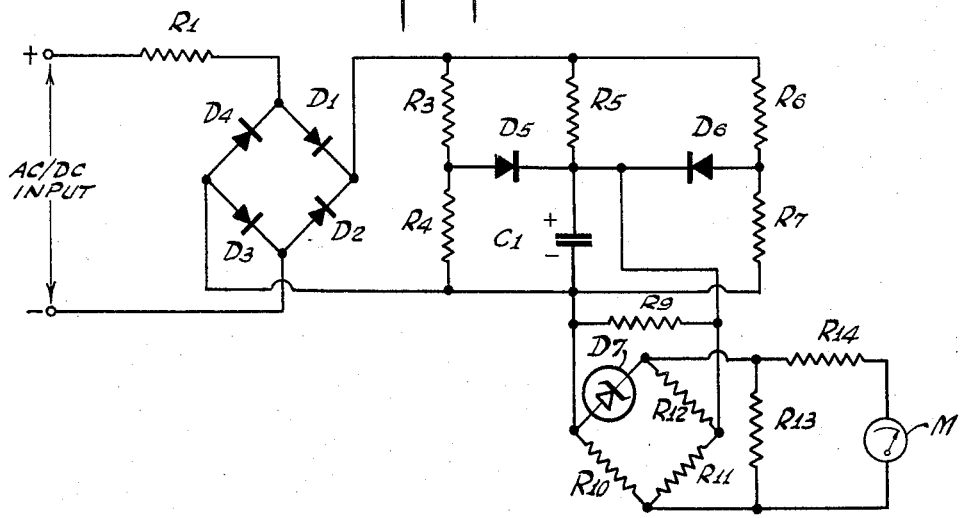
FIG. 3 is a schematic diagram of an expanded scale voltmeter circuit of this invention.

Referring to FIGS. 1 through 3, the basic meter circuit of this invention contains a standard full wave rectifier bridge comprising diodes D1, D2, D3 and D4. In the voltmeter circuit (FIG. 1) and expanded scale voltmeter circuit (FIG. 3), the input voltage is applied to the bridge via a series voltage dividing resistor R1, whose value depends on the impedance of the bridge circuit and the desired range of voltage measurement, as will be apparent to those skilled in the art. In the case of multiple range instruments, of course, R1 will be adjustable in steps corresponding to the desired sequence of ranges. In the ammeter circuit (FIG. 2), the input current is applied directly to the rectifier bridge circuit, which is shunted by a current dividing resistor R2, whose value also depends on the impedance of the bridge circuit, and which will also be adjustable in a multiple range instrument.

In each of the above noted circuits, the output of the full wave rectifier bridge circuit is applied to a novel integrator circuit which comprises the heart of this invention. The integrator contains an integrating capacitor C1, a charging resistor R5, and two re-charging diodes D5 and D6 which are coupled between integrating capacitor C1 and a pair of corresponding voltage dividers R3–R4 and R6–R7. A D.C. meter M is coupled in parallel with charging capacitor C1 via input resistor R8 whose function will be apparent to those skilled in the art. Meter M and its input resistors are adapted to measure the charge on integrating capacitor C1, which is maintained at the true R.M.S. value of the input voltage or current by means of the re-charging diodes coupled thereto.

Initial charging of the capacitor C1 is via the center voltage divider R5, R8–M. Subsequently, and at succeedingly greater values along the rectified input wave, first one and then the other of the voltage divider coupling diodes (D5 and D6) conducts, as they are respectively forward biased, to furnish the capacitor C1 with additional energy. On the reverse slope of the input wave the diodes cut off again in succession. As a result, each divider is cued in for a portion of the rectified input curve and the capacitor in response undergoes a new integration phase. By the appropriate selection of parameters (an example of which is given below), the capacitor registers a R.M.S. related charge the resultant potential of which may be measured by the meter M.

In the operation of the above noted integrator circuit, re-charging diodes D5 and D6 are adapted by their respective voltage dividing networks to conduct whenever the charge on capacitor C1 drops below the true R.M.S. value of the voltage applied to the rectifier bridge. The exact values for the voltage dividing resistors will, of course, vary in accordance with the voltage range to be measured, and the type of meter employed in the circuit, and the type of diodes used in the rectifier bridge and in the integrator circuit. The following values, however, have been found to produce satisfactory results in the circuit of FIGS. 1 and 2 with a 200 microamp, 120 millivolt meter movement.

R1—depends on input voltage range.
R2—depends on input current range.
R3—20K, ¼ w., metal film.
R4—60K, ¼ w., metal film.
R5—40K, ¼ w., metal film.
R6—7.65K, ¼ w., metal film.
R7—4.95K, ¼ w., metal film.
R8—23K, ¼ w., metal film.
C1—2 µf., tantalum solid electrolyte 20 v.
D1-D4—4 matched IN34A 1% F.V.D.
D5, D6—IN34A, 0.4 v., 1.5 ma.

The above noted values will provide an input impedance of approximately 1,000 ohms per volt and a substantially flat frequency response from 0 to 20 k.c. These specific component values, however, are not essential to the invention; any suitable component values can be used which perform the desired functions of (1) charging the integrating capacitor C up to the true R.M.S. value of the voltage applied to the rectifier bridge, and (2) re-charging the capacitor whenever it falls below said true R.M.S. value.

In the circuit of FIG. 3, an expanded scale voltmeter circuit is coupled in parallel with integrating capacitor C1 in place of the voltmeter used in the circuits of FIGS. 1 and 2. The expanded scale voltmeter is adapted to suppress the meter indication until a predetermined starting voltage level is reached, and then to indicate voltages between the predetermined starting voltage and a predetermined full scale voltage. For example, the expanded scale circuit may be adapted to indicate voltages from 20 to 30 volts, or from 90 to 95 volts, or between any other desired starting voltage and full scale voltage as explained more fully in copending patent application Serial Number 128,736, which was filed on August 2, 1961, for an "Expanded Scale Voltmeter." The expanded scale circuit contains an input bridge circuit comprising Zener diode D7 and resistors R10, R11 and R12. When the voltage applied to the bridge is below a predetermined starting voltage level, a voltage of reverse polarity is applied to the meter M, which is adapted to deflect only for voltages of the forward polarity. When the voltage applied to the bridge circuit reaches the predetermined starting voltage level, the bridge is balanced, and no voltage is applied to meter M. When the applied voltage exceeds the predetermined level, the bridge becomes unbalanced in the forward direction, and the meter M is deflected in proportion to the applied voltage. The detailed operation of the various components of this circuit will not be described herein, since they are fully explained in said copending application.

The above described expanded scale voltmeter circuit is not essential to this invention, but it is preferable in many applications because it enhances the accuracy of indication. When the expanded scale circuit is used, it will influence the choice of components in the true R.M.S. circuit, because the impedance of the meter circuit is shunted across the integrating circuit, and the impedance characteristics of expanded scale meter circuits generally differ from the impedance characteristics of zero indicating meter circuits. This will be apparent from the following list of component values which have been found suitable in one specific expanded scale true R.M.S. circuit:

R1—depends on input voltage range.
R3—63K, ⅛ w., metal film.
R4—15K, ⅛ w., metal film.
R5—11.5K, ⅛ w., metal film.
R6—0.25K, ¼ w., metal film.
R7—7.10K, ¼ w., metal film.
R9—depends on input voltage range.
R10, R11 and R12—45K, ⅛ w., metal film.
R13—depends on expanded scale range.
R14—depends on expanded scale range.
D1–D6—IN34A, 0.4 v., 1.5 ma.
D7—Zener diode, 8 v., IZK 150 µa.
C1—2 µf., 20 v., tantalum.
Meter—Weston W1956 (20 µa.).

The expanded scale embodiment of this invention is not, of course, limited to the specific component values listed above by way of example. Any suitable components can be used which perform the desired functions, as noted above in connection with the embodiment of FIG. 2.

It should be noted that the basic circuit of this invention can be used as a highly accurate low power wattmeter which is particularly useful in the testing of gyro motors such as used in stable platforms and missile guidance systems.

From the foregoing description it will be apparent that this invention provides a simple, inexpensive, accurate true R.M.S. meter circuit which has a broad frequency response range and low power consumption. And it should be understood that this invention is by no means limited to the specific embodiments disclosed herein by way of example, since many modifications can be made therein without departing from the basic teaching of this invention, which include all modifications falling within the scope of the following claims.

We claim:
1. A true R.M.S. meter circuit for measuring A.C. or D.C. comprising a full wave rectifier for receiving an electrical input signal to be measured, a capacitor resistively coupled in series with a resistor across the output of said full wave rectifier, means for maintaining the charge on said capacitor at a level proportional to the R.M.S. value of said electrical input signal, said charge maintaining means including a pair of voltage dividers connected across the output of said rectifier and a pair of diodes connected in series in opposed relationship between a tap on one of said dividers and a tap on the other of said dividers, the junction between said diodes being connected to the junction between said resistor and said capacitor, each of said diodes being forward biased by the voltage divider with which it is most closely connected to conduct at a different point on the input signal cycle to maintain the charge on said capacitor at a value that is proportional to the R.M.S. value of said electrical input signal, and a D.C. meter circuit coupled in parallel with said capacitor for measuring the potential thereon, thereby producing a true measure of the R.M.S. value of said electrical input signal.

2. An electrical meter circuit for measuring an A.C. or D.C. input signal comprising: an input full wave rectifier; a plurality of voltage dividers coupled in parallel across the output of said rectifier; a D.C. meter circuit connected in series with a resistor and forming a part of one of said dividers; a capacitor coupled in parallel with said meter circuit between one output terminal of said rectifier and the connection joining said meter circuit and said resistor and a diode coupled between the output of each voltage divider, except the one in which the meter is connected, and said connection, one corresponding element of each diode being connected to said connection, and each of said diodes being forward biased by the voltage divider having its output connected thereto to conduct at a different point on the input signal cycle to maintain the charge on said capacitor at a value that is proportional to the R.M.S. value of said input signal, whereby said meter measures the R.M.S. value of said input signal.

3. The electrical meter circuit claimed in claim 2 in which said D.C. meter circuit comprises a resistor and a D.C. meter in series.

4. The electrical meter circuit as claimed in claim 2, in which said meter circuit comprises an expanded scale voltmeter circuit.

References Cited by the Examiner
UNITED STATES PATENTS 2,810,107  10/1957  Sauber.
2,924,769  2/1960  Harriman et al. _____ 324–111
3,079,556  2/1963  Connelly _____ 324–132 X

FOREIGN PATENTS 1,210,641  10/1959  France.

WALTER L. CARLSON, *Primary Examiner.*
FREDERICK M. STRADER, *Examiner.*
D. R. GREENE, J. J. MULROONEY,
*Assistant Examiners.*